Figure 5:
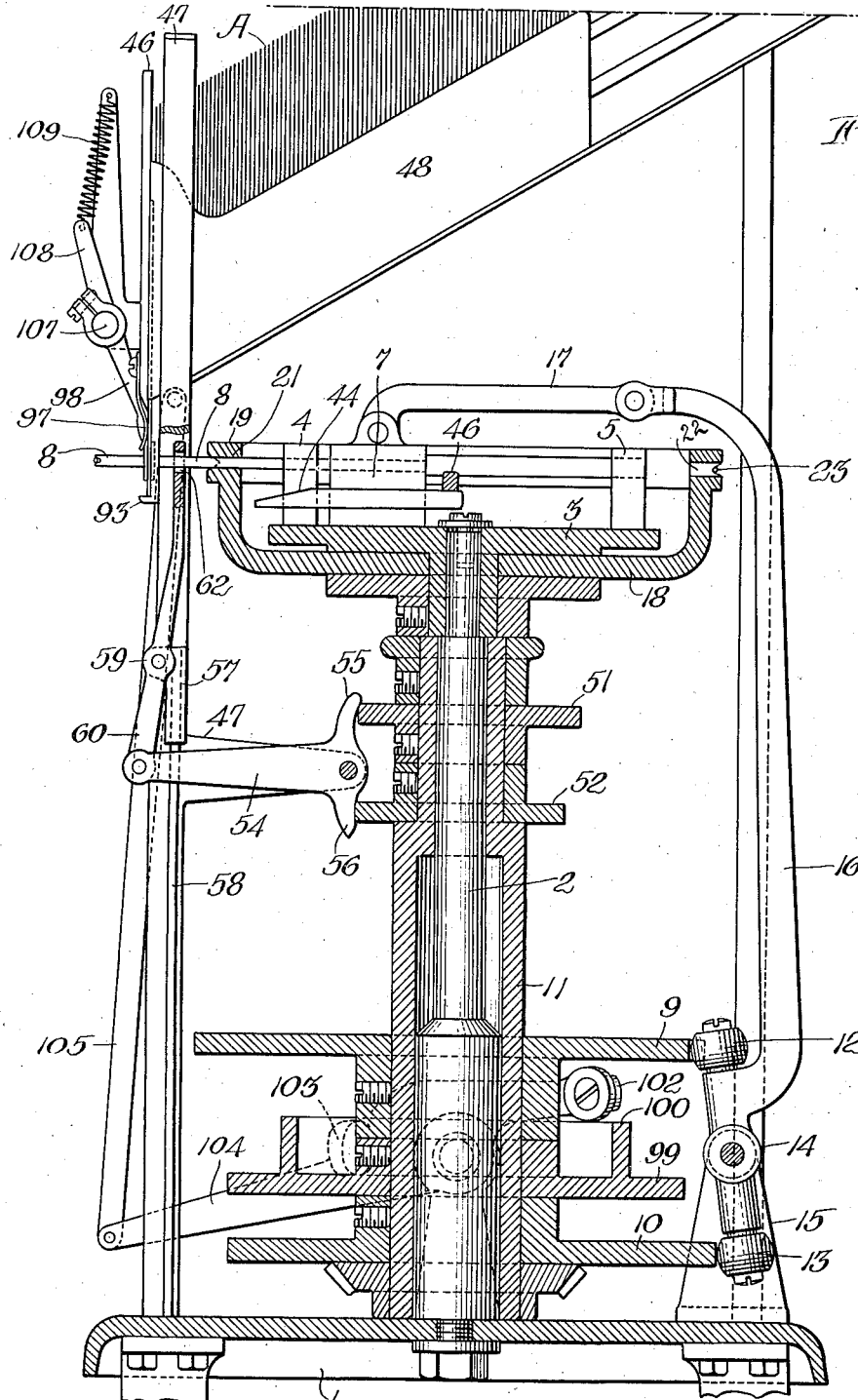

C. SYLVESTER.
MACHINE FOR STRINGING TAGS.
APPLICATION FILED MAR. 24, 1913.
1,066,163.
Patented July 1, 1913.
6 SHEETS—SHEET 1.
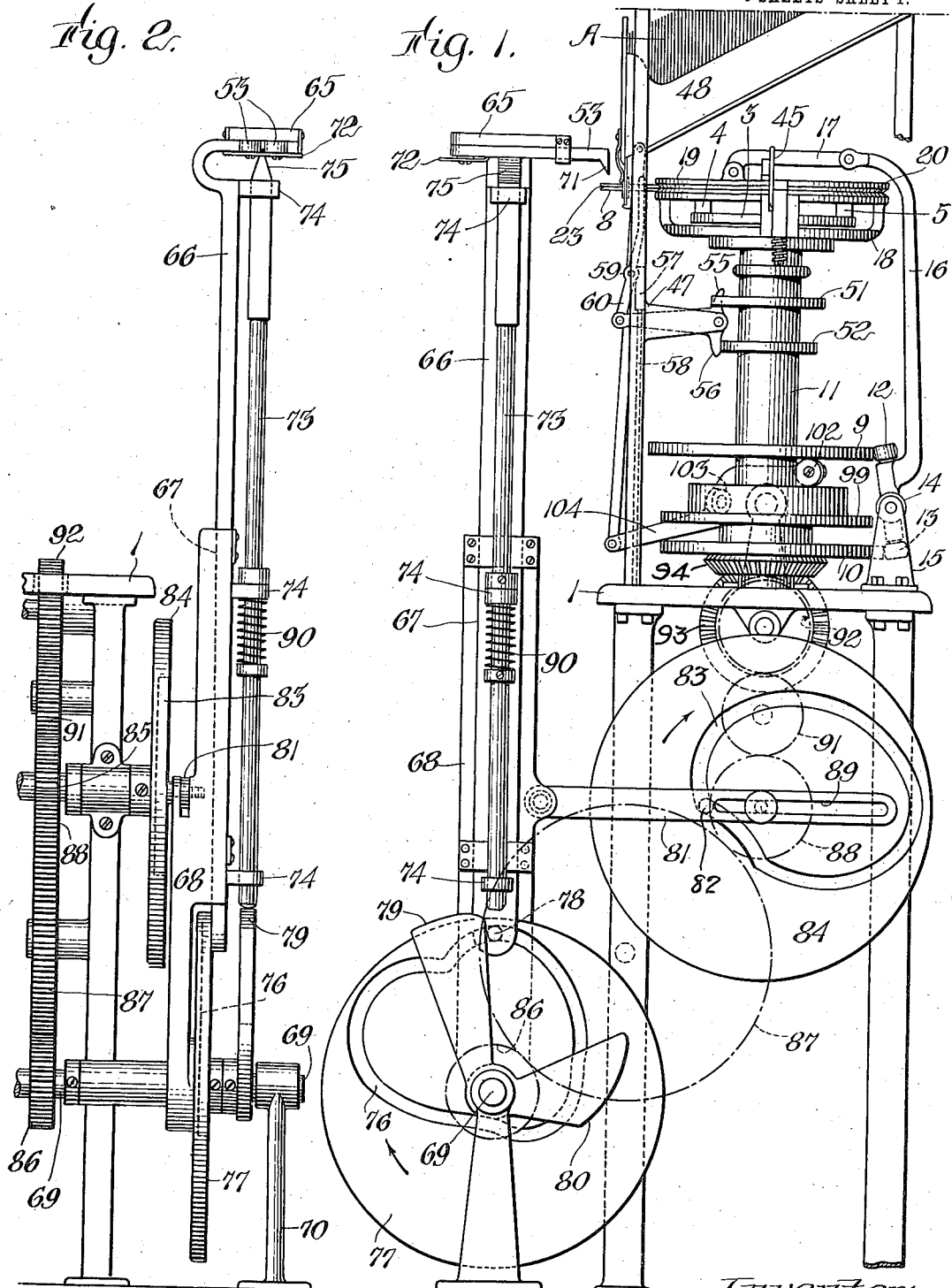

C. SYLVESTER.
MACHINE FOR STRINGING TAGS.
APPLICATION FILED MAR. 24, 1913.

1,066,163. Patented July 1, 1913.
6 SHEETS—SHEET 2.

Witnesses:
H. C. Bowser
L. B. Weymouth.

Inventor:
Charles Sylvester
by his attorney
Charles H. Richardson

C. SYLVESTER.
MACHINE FOR STRINGING TAGS.
APPLICATION FILED MAR. 24, 1913.
1,066,163.
Patented July 1, 1913.
6 SHEETS—SHEET 3.
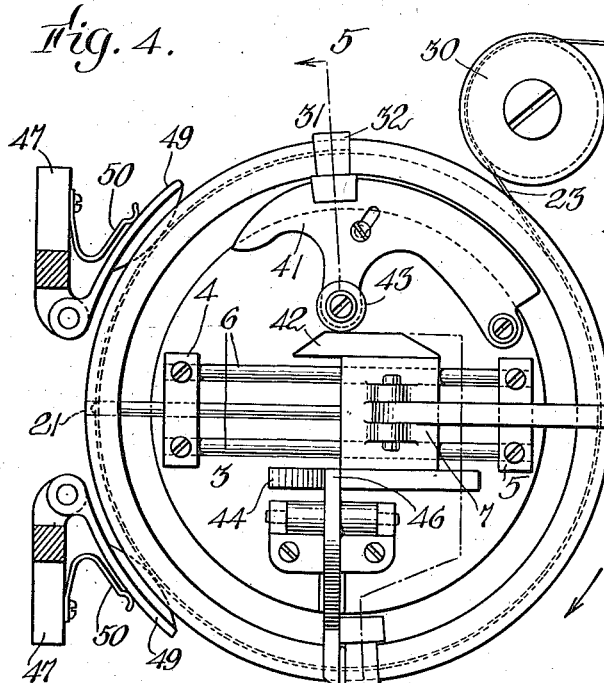
Fig. 4.
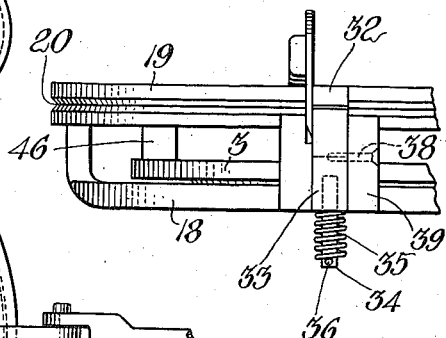
Fig. 7.
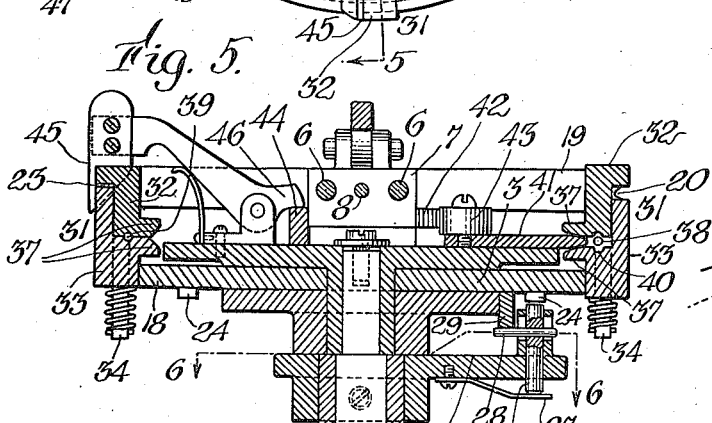
Fig. 5.
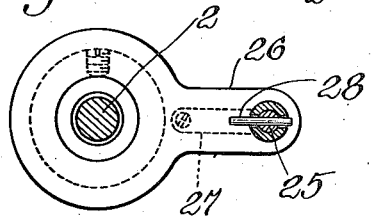
Fig. 6.
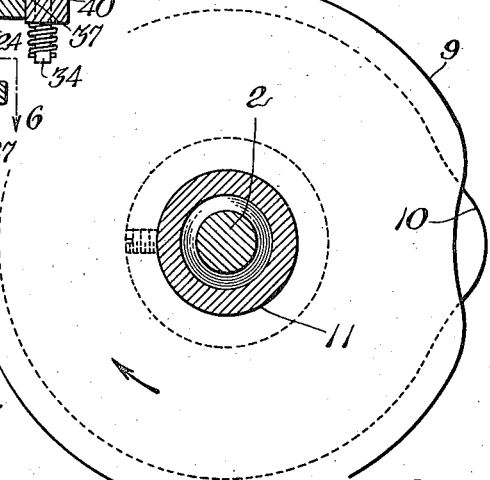
Fig. 8.
Fig. 9.
Witnesses:
H. C. Bowser
L. B. Weymouth
Inventor:
Charles Sylvester
by his attorney
Charles F. Richardson

C. SYLVESTER.
MACHINE FOR STRINGING TAGS.
APPLICATION FILED MAR. 24, 1913.

1,066,163.

Patented July 1, 1913.
6 SHEETS—SHEET 4.

Witnesses:
H. C. Bowser
L. B. Weymouth

Inventor:
Charles Sylvester
by his attorney
Charles F. Richardson

C. SYLVESTER.
MACHINE FOR STRINGING TAGS.
APPLICATION FILED MAR. 24, 1913.
1,066,163.
Patented July 1, 1913.
6 SHEETS—SHEET 5.
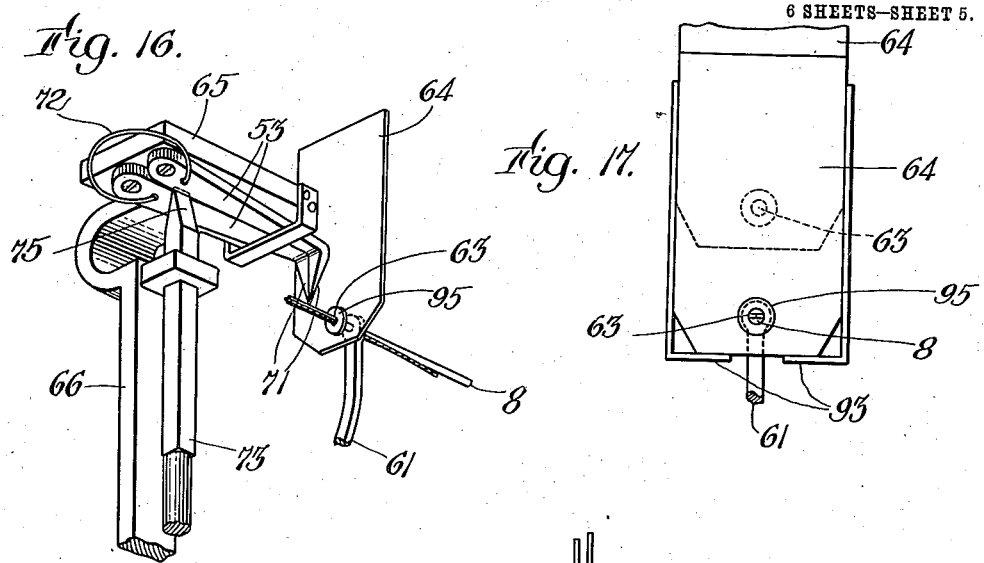
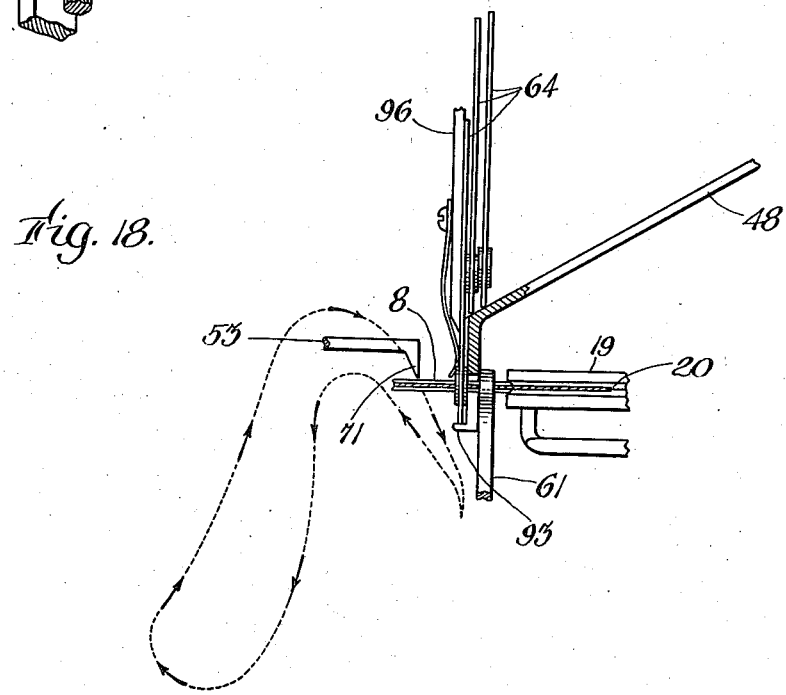
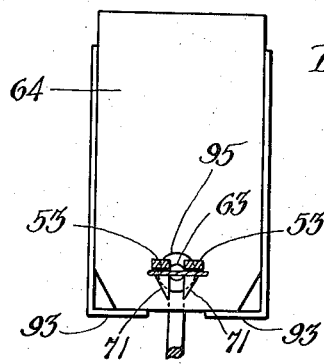

C. SYLVESTER.
MACHINE FOR STRINGING TAGS.
APPLICATION FILED MAR. 24, 1913.
1,066,163.
Patented July 1, 1913.
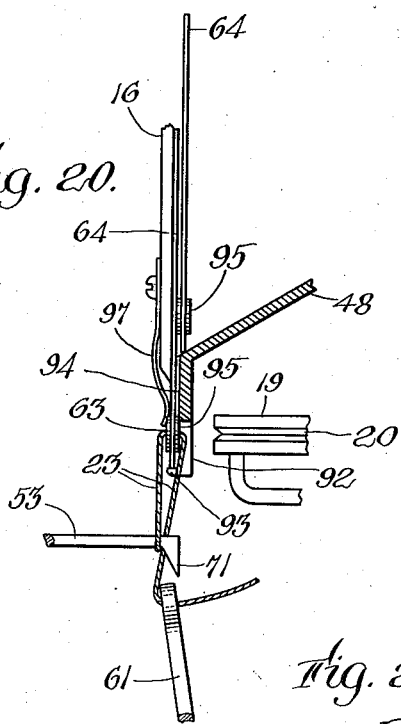
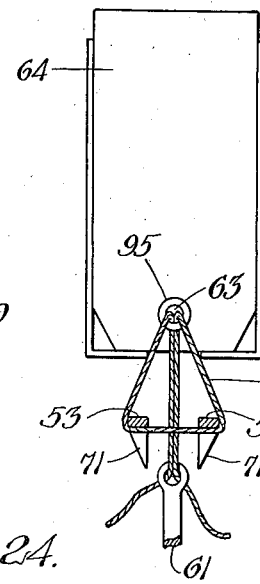
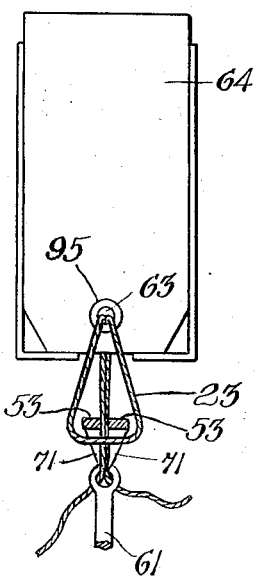
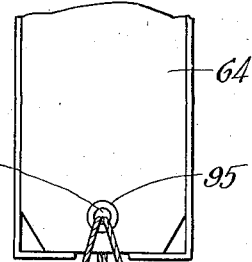
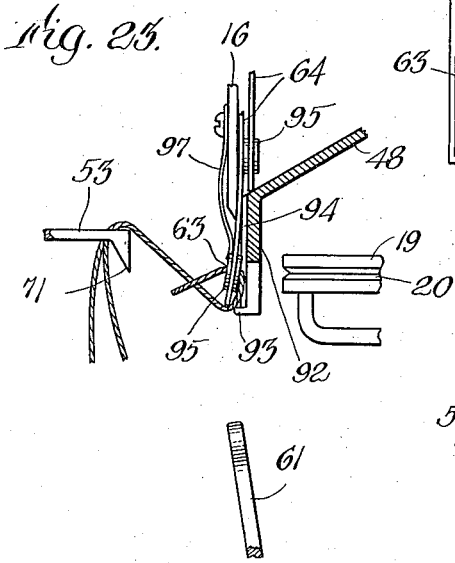
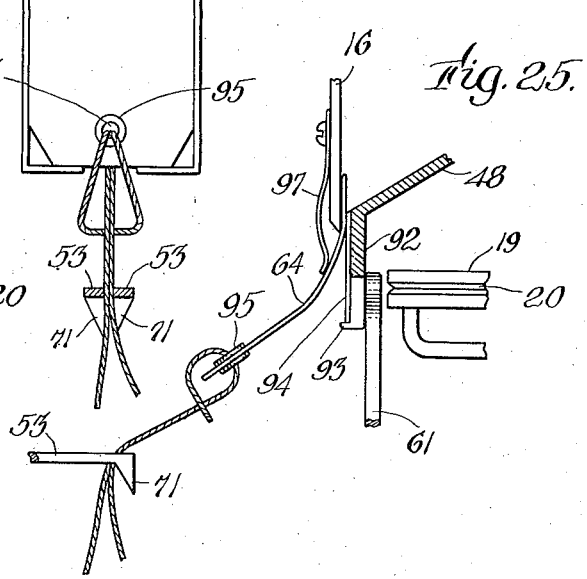
Witnesses:
H. C. Bowser
L. B. Weymouth.
Inventor:
Charles Sylvester
by his attorney
Charles F. Richardson

UNITED STATES PATENT OFFICE.

CHARLES SYLVESTER, OF FALL RIVER, MASSACHUSETTS, ASSIGNOR TO WINFORD C. WETHERELL, OF FALL RIVER, MASSACHUSETTS.

MACHINE FOR STRINGING TAGS.

1,066,163.

Specification of Letters Patent.

Patented July 1, 1913.

Application filed March 24, 1913. Serial No. 756,275.

*To all whom it may concern:*

Be it known that I, CHARLES SYLVESTER, a citizen of the United States, residing at Fall River, in the county of Bristol and State of Massachusetts, have invented certain new and useful Improvements in Machines for Stringing Tags, of which the following is a specification, reference being had therein to the accompanying drawings.
One feature of my invention resides in string feeding mechanism, as for machines for stringing tags, which employ a reciprocating rod for pushing a length of string through the eye of the tag. Such a rod is shown in United States Letters Patent No. 839,241, issued to Winford C. Wetherell, December 25, 1906. The criticism of the string feed, illustrated in this patent, is that the string is not positively delivered into position to be operated upon by the push rod, its successful delivery depending upon its own stiffness, and its uniformity in size, notwithstanding the string is assisted by guide tubes, through which it is pushed by means of feed rollers. Occasionally the string, if not sufficiently stiff or if variable in diameter, will double up, or bind in, the tubes, and fail to arrive in operative position in front of the push delivery rod.
Now the object of the present feature of my invention is positively to deliver this string, without placing any reliance upon its stiffness, uniformity in size and the like; and I attain this object by a rotatable ring to receive and operatively hold upon its circumference, string that may be seasonably cut into the desired length, and released; and then pushed away from the ring and through the eye of a tag by a reciprocating push rod operatively mounted within the ring.

Another feature resides in a simplification of the tag tying mechanism shown in the above mentioned patent, and is brought about by the substitution of reciprocating for rotating parts, when possible.

A third feature may be found in the tag feeding mechanism, which is not hereinafter claimed, although described to explain clearly the cycle of operations involved in stringing tags.

Figure 10:
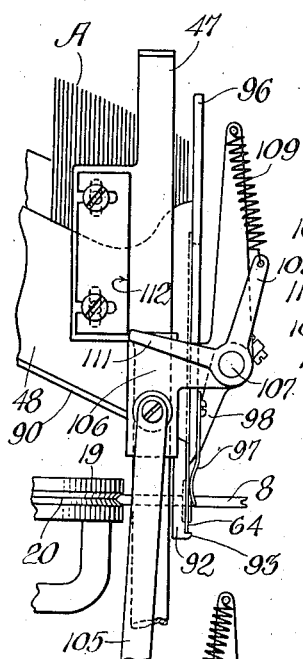
Figure 11:
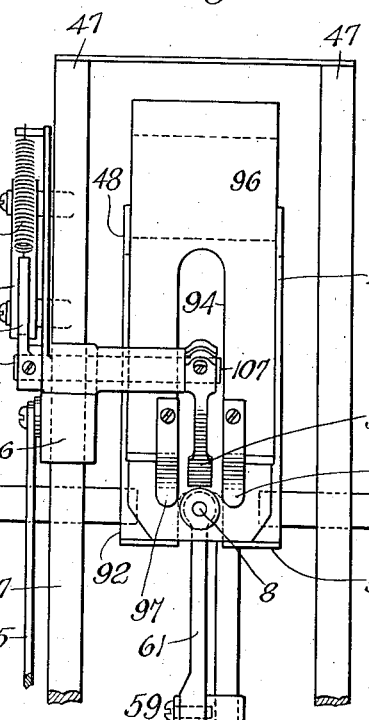
Figure 12:
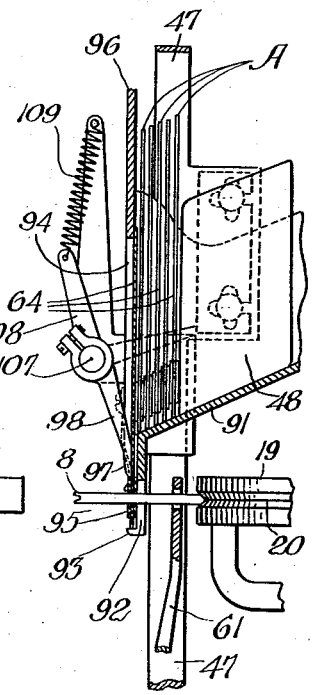
Figure 13:
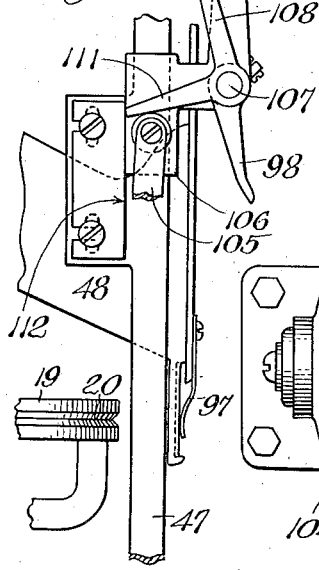
Figure 15:
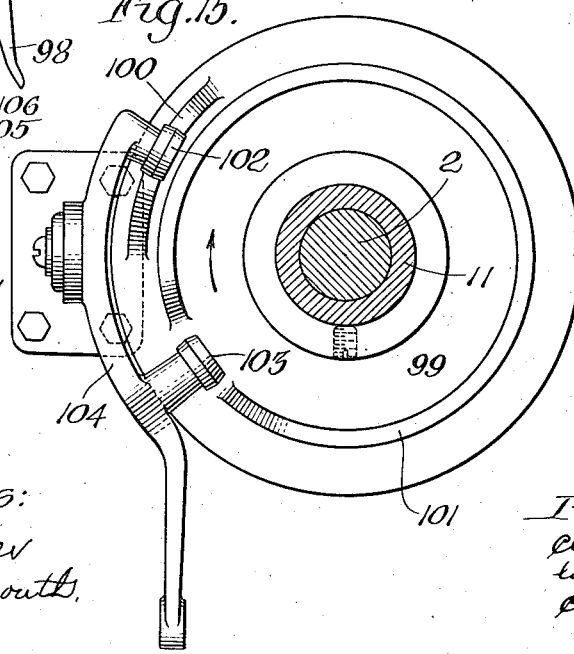
Figure 14:
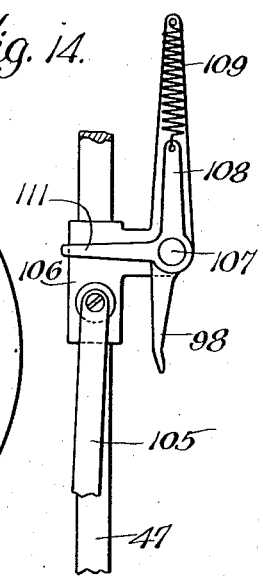

In the drawings illustrating the principle of my invention and the best mode now known to me of embodying the same in operative structure, Figure 1 shows my invention in side elevation. Fig. 2 is a front view showing the principal mechanism employed in completing the operation of stringing a tag. Fig. 3 is a side view showing the string feed, partly in section, and tag feeding mechanism. Fig. 4 is a plan of the string feed mechanism. Fig. 5 is a section of what is shown in Fig. 4 on line 5—5. Fig. 6 is a bottom plan view of what is shown in Fig. 5 on line 6—6. Fig. 7 is an elevation of part of the string feed. Fig. 8 illustrates cams employed in operating the tag feed mechanism. Fig. 9 shows cams used in giving a positive reciprocating movement to the push rod of the string feed mechanism. Fig. 10 is a side elevation of a tag chute with means for delivering the tags into operative position to be strung by the string feed mechanism. Fig. 11 is a front view of the same. Fig. 12 is a sectional view of the tag feed mechanism viewed from the side opposite that shown in Fig. 10. Fig. 13 shows a portion of the tag feeding apparatus near its uppermost position. Fig. 14 shows said apparatus in an intermediate position. Fig. 15 is a plan showing the cams and apparatus operated thereby to give the desired positive reciprocating movements to the tag feeding finger. Figs. 16, 17, 18, 19, 20, 21, 22, 23, 24 and 25 are views to show the various positions assumed by each tag, string therefor and parts employed, from the beginning to the end of the operation of stringing and withdrawing the tag from the tag stringing machine.

*String feeding mechanism.*—Mounted upon a suitable base 1 is a vertical, stationary shaft 2 to the top end portion of which is fixed a horizontal, circular plate or table 3. Two guide blocks 4, 5, are secured diametrically opposite upon the top of this table, while two guide rods 6, parallel with the diameter of the table, connect these two blocks. Upon these parallel rods is reciprocatingly mounted, a push rod block 7 having horizontally and adjustably mounted therein, a string push rod 8 having a bearing in the forward block 4, and having its outer end notched. To give this block a positive reciprocating motion, a pair of cams 9, 10, Figs. 1, 3 and 9, are fixed to a hollow shaft 11 surrounding the stationary shaft 21, and are engaged by two cam rolls 12, 13, upon opposite arms of a member 14, pivoted to a slotted standard 15 on the base 1. Integral with this member is an upwardly extending arm 16, the outer end portion of which, and the reciprocating push rod block 7, are joined together by a connecting link 17.

Free to turn upon the stationary shaft 2, but just below the table 3 for the reciprocating push rod, is a rotatable disk 18 of larger diameter than the table, and having a raised outer rim 19, with a circumferential groove 20 designed to receive the string eventually to be delivered to tag tying mechanism, later to be described. Two horizontal holes 21, 22, Fig. 3, diametrically opposite, and corresponding with the reciprocating push rod, in cross section, pierce the rim 19 to allow the notched push rod 8 to move through the rim and to engage the string 23 in the circumferential groove 20, in a way to be pointed out. In order that this rim, or string supporting member 19 may be moved one half of a revolution, upon each revolution of the shaft 2, and be left in position to permit the push rod to move uninterruptedly, through the holes 21, 22, in the rim of this string member, there are located in the bottom portion of this string member, and diametrically opposite, two lugs 24, Fig. 5, alternately engaged by a vertically operated pin 25 mounted in a horizontally extending arm 26 fixed to the movable hollow shaft 11, the bottom portion of the pin being engaged by a spring 27 constantly tending to hold the pin in its extreme top position. A cam-bar 28 extends laterally from the side of this pin 25 through its bearings, and may be moved by an unlocking cam member 29, so fixed and located upon the stationary shaft that the cam-bar engages the cam, and, consequently, the lock pin 25, moves below and becomes disconnected from the adjacent lug 24 on the rotatable string disk 18, when the push rod holes 21, 22, in the string rim 19, are in alinement with the reciprocating string push rod 8; thus leaving the string disk and rim in the desired position, where it remains by its frictional engagement with the stationary surface of the table and shaft. But upon the completion of the next half revolution of the shaft, the vertically operated lock pin 25 engages the next opposite lock lug 24, and moves the string member another half of a revolution; the unlocking cam 29 again operating the cam-bar 28, and disengaging the pin 25 from the adjacent lock lug 24.

The string 23, Fig. 4, is delivered to this string rim 19, from a tension device 30 having the string wound thereon, the string being delivered in a plane common to that of the circumferential string groove 20 in the rim. The string is there held by two diametrically opposite string clamps 31, Figs. 4, 5 and 7, each of which is made up of two interlocking L-shaped members 32, 33, Fig. 5; one, 32, having a guide rod 34 mounted in a corresponding hole therefor, through the other member 33. These two members 32, 33, of each clamp 31 are mounted in suitable vertical slots in the rim 19, and always tend to be in string locking engagement, by reason of a tension spring 35 mounted upon the outer end portion of the rod 34, and confined between a pin 36 passing through the end portion of said rod, and the under surface of the thread member 33. Each of these members, upon its inner side, has a lip 37, normally engaging the other; a pin 38, Figs. 5 and 7, passing through a portion 39 of the disk, and into a slot 40 common to the members, whereby they are held in proper relation to the string groove of the rim. Upon the top surface of the table is a pivoted blade-like cam 41, Figs. 4 and 5, which, at suitable times, is designed to move between these lips 37, 37, for the purpose of separating them to release the string 23. This is brought about by a cam 42, Fig. 5, fixed to the outside of the reciprocating push rod block 7, and operated by a roller 43 on the knife blade cam. On the opposite side of this reciprocating block 7, is fixed another cam 44 suitably designed to operate a knife blade 45, Figs. 4, 5 and 7, through an arm 46 pivoted to the top of the table 3, leaving the string in position to be delivered by the push rod to the tag tying mechanism.

Fast to a frame 47, Fig. 4, supporting a tag chute 48, Fig. 1, and upon opposite sides of the path of the reciprocating string push rod 8, Fig. 4, are two pivoted string presser fingers 49 the outer portions of which lie in the plane of the circumferential string groove 20, and press inwardly toward the groove because of two rear springs 50 fixed to the frame.

*Tag tying mechanism.*—The string push rod 8 and connecting apparatus, although incidentally connected with the above described string feed mechanism, belong primarily with the mechanism about to be described.

Secured to the movable shaft 11 are two cams 51, 52, Figs. 1, 2 and 8, for positively operating the apparatus to deliver the two ends of the severed string to fingers 53 completing the operation of tying the string in the tag. A lever member 54 is pivoted to the frame 47, and has two vertically extending cam arms 55, 56, to be engaged by cams 51, 52; while pivoted to a slide 57 movably secured in vertical guideways 58 in the frame, is a second lever 59, one end 60 of which is pivoted to the free end of the lever 54, while the opposite end 61 has therethrough a hole 62, Fig. 3, which is designed to be in alinement with the reciprocating string push rod 8 when the push rod is in active position, and through which the loop is pushed on its way to the tag. The two cams and levers are so designed that the end 61 of the lever having the hole 62, moves positively, downwardly and outwardly, and vice versa.

The means whereby the string is drawn into the form of a slip noose after the loop of the string has been pushed through the eye in the tag by the push rod may be described as follows:—The pair of fingers 53, Figs. 1, 2 and 16, are designed to pass down through the loop of the string pushed through the eye 63 of the tag 64, by the push rod 8. Their outer end portions are pivoted to the under side of a shelf 65, forming a continuation of a reciprocable rod 66; this rod being mounted in suitable guideways 67 formed in an arm 68 pivoted to a driving shaft 69 mounted in suitable bearings, in a standard 70. The free ends 71 of these fingers are each brought down to a point, and are held in close proximity by means of a spring 72, Fig. 16, secured to the rear end portion of the fingers. In order that the points of the fingers may be moved away from each other, there is mounted upon the before mentioned reciprocable rod 66, a jaw controlling reciprocating rod 73 movably secured in suitable guides 74. The outer end portion of this latter rod 73 has inclined converging surfaces 75 adapted to enter between the pivoted fingers 53 for the purpose of causing them to open against the action of the spring 72, or to close, upon its withdrawal, by the action of the spring. The vertical reciprocations of the first mentioned rod 66 are brought about by a cam slot 76 on a member 77 mounted on the driving shaft, engaged by a cam pin 78; while the desired reciprocating movements of the jaw controlling rod 73 result from the coöperation of its inner end with two suitable cams 79, 80, mounted on the driving shaft also. In other words, by so much of the structure described, the fingers are given a vertical movement and also a transverse opening and closing movement. It is to be noted that the plane separating the two fingers is substantially that passing through the longitudinal axis of the string push rod 8. A further movement must be imparted to these fingers, namely, a vibratory movement forward and back in this plane, and it is brought about by means of a link 81, connected to the pivoted arm member 68, in which the first mentioned reciprocating rod 66 is mounted, and also provided with a cam pin 82 which moves in a suitable cam slot 83 in a cam plate 84, fixed to a secondary driving shaft 85, operated by the first driving shaft 69 through a chain of gears 86, 87 and 88. This link 81 has in it a longitudinal slot 89 through which passes an extension of the secondary driving shaft. That the jaw controlling rod 73, which opens the fingers, may always be in a position to engage its operating cam, it has upon it, a helical spring 90 having suitable abutments whereby the spring constantly tends to hold the cam end of the rod in contact with its cam surfaces. By means of a suitable train of gears 88, 91, 92, Figs. 1 and 2, and bevel gears 93, 94, Fig. 1, the tag tying mechanism and the string feed mechanism, and the tag feeding mechanism about to be described, are caused to operate completely upon each revolution of the driving shaft 69.

*Tag feeding mechanism.*—The tag feeding mechanism consists of a downwardly inclined chute 48, in which may be arranged vertically the desired number of tags A, Figs. 1, 3, 10 and 12, to be threaded or strung; the width of the chute corresponding to the width of the tags, as shown in Fig. 11. Depending from the bottom 91 of the chute is an apron 92 having a divided shelf 93 across its lower front edge to sustain a tag as 64, to be delivered thereon. In the rear surface of this apron is a vertical slot 94, (see Fig. 25) corresponding in width and depth to that of the reinforcement 95 of the eye on the back of the tag. To retain the tags in the chute is a vertical slotted metal plate 96 across the lower end of the chute; the slot being for the exposure of the front reinforcement of the eye. This plate, however, lies in a vertical plane parallel with that of the face of the apron 92, but at a distance therefrom corresponding to the thickness of the tag 64. This plate extends down in front of the chute to about the same level as the bottom 91 of the chute. Located on the outside of the plate, on either side of the vertical slot 94, Fig. 11, there is a spring finger 97 extending downwardly so as to engage the bottom portion of the tag when moved into position on the shelf of the apron, and to hold it there. A weight, not shown, has rolls upon its bottom, pushing downwardly at the rear of the pack of tags A to force into position, the next tag upon the withdrawal of that in front of it. To move the front tag into position to have its eye in alinement with the reciprocating string push rod, a vibrating finger 98 is designed to slide down the face of the tag, and in so doing to engage the paper reinforcement of the eye on the front face of the tag. This is brought about primarily, by means of a disk 99, Figs. 1, 3 and 15, secured to the rotatable shaft 11 and provided with two vertical circularly arranged cam surfaces 100, 101, upon which two rolls 102, 103, are connected to a vibrating arm 104 to give a positive forward and back movement. To one end of this arm 104 is connected a vibrating lever 105, Fig. 3, the outer end of which is pivoted to a head 106, Figs. 10 to 14 inclusive, sliding on a vertical guide or frame 47. It is to a shaft 107 in this head 106 that the above mentioned finger 98 is connected so that its free end lies in the slot 94 in the front plate 96 of the chute. From this shaft there extend two arms in the form of a bell-crank lever, at right angles to each other; one arm 108 being held in a substantially vertical plane as in Fig. 14, by a tension spring 109, in the same plane and fast to a portion 110 of the head 105, the finger being out of, and in front of the plane of the tag; and the other arm 111 being substantially horizontal, when the head is at its extreme top and bottom positions, and the free end of the arm 111 is above or below and out of contact with, a vertical cam surface 112 vertically and horizontally adjustable, so that its distance from the axis of the shaft 107, to which the arm 111 is fixed, is less than the length of this arm.

*The operation of my invention.*—We will assume that all of the tags A including the tag 64 shown as resting on the shelf 93 of the apron 92 are in alinement; that the head 106 of the tag feed is approaching the uppermost point of its stroke as shown in Fig. 13, and the end of the guide arm 111 is about to slip off of the cam surface 112, and assume the position shown in Fig. 14; and that the driving shaft, consequently the hollow shaft 11, Figs. 3 and 15, has begun to revolve. The roller 102 of this tag feed mechanism, is raised by the approaching surface 100, thereby drawing down the arm 104, link 105, Fig. 3, and hence the head 106, Figs. 10 and 14. In so doing the free end of the guide arm 111 strikes the top end surface of the cam 112, Fig. 10, and against the tension of the spring 109, follows down the cam; the delivery arm or finger 98, Fig. 12, moving down, along the face of the tag 44; coming into contact with the edge of the front reinforcement 95 of the tag, and pushing the tag upon the shelf 93; the rear reinforcement on the tag passing down the slot 94 in the face of the apron 92. The tag 64 is now in position to be strung, the springs 97, Fig. 11, holding the tag in place.

A length of string, equal to the circumferential distance in the thread groove 20, of the disk rim 19 of the string feed mechanism, Figs. 3 and 4, between the knife blade 45 and the clamp 31 in advance of it, is assumed to be retained in the groove by the string brakes 49, Fig. 4. The string push rod 8; the hole 21, in the rim 19 of the rotatable disk 18; the hole 62 in the string delivery lever 59; and eye in the tag 64 are all in alinement; and they will all remain so until the lock pin 25, Fig. 5 engages the lug 24 diametrically opposite. The push rod cams 9, 10, Fig. 3 begin to operate and cause the arm 16, link 17, and block 7 to move forward; the latter along the guide rods 6; and the string push rod 8 through the hole 21 in the rim, but in so doing the notch in the end of the rod engages the mid-portion of the string in the adjacent grooves 20, and, overcoming the pressure of the brakes 49, on the string, forces the loop of the string through the hole 62 in the end of the string end delivery lever 59, Fig. 3, and also through the eye of the tag 64, as shown in Figs. 3 and 17. Meanwhile the fingers 53, of the tag tying mechanism, have assumed the position in Fig. 1, and are moving downward and toward the top of the push rod 18, as shown, for example, in Figs. 16 and 18; this movement being brought about and continued, first, because of the cam pin 78 in the bottom portion of the reciprocating rod 66, Fig. 1, engaging the cam slot 76 on the disk 77 of the driving shaft 69; and second, by reason of the link 81, the cam pin 82 of which engages the cam slot 83.

When the fingers 53 are in the position shown in Figs. 16 and 18, the converging surfaces 75 of the finger rod 73 begin to move the fingers apart, because the bottom end of the rod engages the cam surface 79; the points 71 of the fingers passing down between the string in each side of the push rod 8, Fig. 19, and simultaneously separating the loop of the string which moves up onto the shank of the fingers, beyond the points 71, as shown in Fig. 20, and is spread by the expanding fingers 53 as shown in Fig. 21; the push rod 8 having been withdrawn by the action of the cams 9 and 10, Fig. 3, through the eye of the tag, and the hole 62 in the string delivering member 61, the ends of the string still lying in the hole 62 thereof. But immediately after this withdrawal of the push rod 8, the cams 51, 52, on the main shaft, operate through the arms 55, 56, and cause the string member 59 to descend downwardly and forwardly into the position of the part 61, shown in Figs. 20, 21 and 22. When the fingers 53 and their points 71, are in the position seen in Figs. 20 and 21, the finger rod 73, ceases to be operated by the cam 79; the surfaces 75 receding from between the fingers, and the spring 72 making them approach and seize the end portions of the string, as appears in Figs. 21, 20 and 22. The cam slot 76 at this point begins to move the cam pin 78 in the bottom of the rod 66 upward and away from the string delivery member 61, through which the ends of the string extend, and in so doing, causes the ends of the string to be withdrawn from this member, and drawn up through the loop of string, as shown in Fig. 23. In moving away from the tag, the fingers 53, Fig. 23, tighten the ends of the string passing through the loop and in so doing draw the bottom of the tag off of the shelf 93 against the pressure of the springs 97. The fingers 53 are then given a further outward and downward movement by the action of said cam pin 78 and the cam slot 76, and the link 81 and cam slot 83 and pin 82, as indicated in dotted lines in Fig. 18. In this way, the tag is withdrawn from the chute, as indicated in Fig. 25. The fingers 53 are then given an upward and forward movement by the last mentioned cams and the cam pins, and simultaneously the lower end portion of the reciprocating jaw rod 73 engages the cam surface 80, Fig. 1, thereby again forcing the fingers 53 apart, and releasing the free ends of the tag; the latter dropping into a suitable receptacle. The cycle of operations, in so far as the stringing of the tag is concerned, is completed. But upon the withdrawal of the push rod 8, of the string feed mechanism, from the eye of the tag delivered, and the hole in the rim of the disk 19, the lock pin 25, Fig. 5, moves into engagement with the lug 24 at the left of the figure, and begins to cause the disk to move just one half of a revolution; at the completion of which the lock pin assumes the position indicated in Fig. 5, and passes by the adjacent lug 24; the disk being aided in stopping by the friction string brakes 49, Fig. 4; but when this disk begins to move, the lips 37, 37, of the clamp, Fig. 5, are separated, by reason of knife blade cam 41, as shown in the figure; but when the separated clamps slip off of the end of the cam blade, they snap into engagement with the string 23 which is being delivered from the tension device 30 to the thread slot 20, in the rim 19. All this while, however, the clamp 31 diametrically opposite, as shown in Fig. 5, is also in engagement with the free end of the string 23, which, by the knife 45, was severed from the length of string already described as delivered to the tag. Consequently, at the completion of each half a revolution of the disk, the free end of the string, shown in the clamp at the left of Fig. 5, is carried around to the diametrically opposite position, at the right of the figure, where the clamp, by reason of its engaging the cam blade 51, releases the string end held by it; while the clamp 31 directly opposite and adjacent to the knife blade 45 is in position to have its string severed by the blade operated by the cam 46, as already explained; this severing of the string being brought about by the next outward movement of the cam 48 and the push rod 8, for the purpose of delivering the severed string through the eye of the next tag to be strung. Meanwhile, the cams 51, 52 have caused the string end delivering member 59, with its hole 62, to move up into alinement with the string push rod 8; and guide arm 111, Figs. 10 and 14, of the tag feed, having reached the bottom of its stroke, the tag finger 98, auxiliary arm 108, and guide arm 111 have assumed the substantial position, shown in Fig. 14; and, on the upward stroke of the block 106 the end of the guide arm 111 follows up the cam surface 112, and assumes the position indicated in Fig. 13, just before the block reaches its top position, where the end of the guide arm 111 slips off of the cam surface 112, and again assumes the position shown in Fig. 14, and above the cam surface 112. Upon the downward stroke of the block 106, for the purpose of delivering the next tag by causing the tag finger 98 to slide down the surface of the tag and engage the front reinforcement of its eye, the guide arm 111, Fig. 14, in its downward movement, contacts the cam surface 112, which causes the delivery tag finger to press against the face of the tag and slide down the face thereof, engage the top of the front reinforcement of the tag eye, and push the tag down upon the shelf 93 of the apron 92, as appears in Figs. 10, 11 and 12, in the manner already fully described. This cycle of operation takes place and is repeated upon each revolution of the driving shaft. The timing of the different operations, and the various forms of cam surfaces and the like, will be readily understood without further description; it being understood that formal changes in structure may be made without departing from the spirit of my invention.

Desiring to protect my invention in the broadest manner legally possible, what I claim is:—

1. In a tag tying machine, a timely reciprocating string push rod; a string-end delivering device, through which the push rod partially pushes a loop of string; means to move this device beneath a tag; a pair of string gripping fingers, the downward points of which, when closed, are in the plane of the longitudinal axis of the reciprocating push rod; means to move them about a center toward and away from the push rod; reciprocating means mounted in said last mentioned means, to cause the fingers to reciprocate upwardly and downwardly; and vibrating means mounted in the reciprocating means to cause said fingers to open and close at predetermined times; all designed to cause the fingers to pass down through the loop of string supplied by the push rod, open and seize the free ends of the loop of string moved into suitable position by the string end delivering device, and then draw the free ends up through the loop, and release them.

2. In a tag tying machine, a timely reciprocating string push rod; a string-end delivering device, through which the push rod partially pushes a loop of string; means to move this device beneath a tag; a pair of string gripping fingers, the downward points of which, when closed, are in the plane of the longitudinal axis of the reciprocating push rod; means to move them about a center toward and away from the push rod; reciprocating means mounted in said last mentioned means, to cause the fingers to reciprocate upwardly and downwardly; and vibrating means mounted in the reciprocating means to cause said fingers to open and close at predetermined times; all designed to cause the fingers to pass down through the loop of string supplied by the push rod, open and seize the free ends of the loop of string moved into suitable position by the string and delivering device, and then draw the free ends up through the loop, and down to withdraw the tag from the machine and then release the string ends and drop the tag.

3. In a tag tying machine, a timely reciprocating string push rod; a string-end delivering device, through which the push rod partially pushes a loop of string; means to move this device downward and outward beneath a tag; a pivoted arm timely operated by a cam; a reciprocating rod mounted in said arm and operated by a cam; a pair of string gripping fingers mounted upon the outer end portion of said arm, the downward points of which fingers, when closed are in the plane of the longitudinal axis of the push rod; a finger operating rod, mounted in the reciprocating rod, and operated by a cam to cause said fingers to open and close at predetermined times; all designed to cause the fingers to pass down through the loop of string, open and seize the free ends of the loop of string, moved into suitable position by the string-end delivering device, and then draw the free ends up through the loop and release them.

4. A rotatable string disk having a circumferential string groove; a table within the circumference of the disk, and stationary in relation to the disk; a reciprocatable string push rod mounted upon said table, and operating in the plane of the string groove; string gripping devices upon the string disk; means to cause each, while moving with the disk at a predetermined point of its complete revolution, to seize a piece of string drawn onto the disk; means to cause each gripping device to release the string, upon the last stoppage of the string disk before the device again seizes the string being fed to the disk; means to sever the string simultaneously with said release of the string; the preceding gripping device still retaining the end of the string being fed to the disk; a pair of spring fingers on the frame of the machine, engaging the piece of string, severed, and released by the forward string gripping device; means to hold the latter device open until it is again in position once more to seize the string fed into the string groove of the string disk; and then to release the device to seize the string; all designed to permit the push rod upon each revolution of the disk, to engage the mid portion of the severed string, and push it away from the disk and out of contact with the string retaining fingers.

5. A stationary shaft; a rotatable string disk mounted upon said shaft having a circumferential string groove; a table within the circumference of the disk, and mounted upon the stationary shaft; guideways upon said table; a reciprocating string push rod; a cross head mounted upon the guideways, and carrying said push rod; said push rod operating in the plane of the string groove; there being holes in said string disk through which the push rod may move; and means to move the disk so that a hole will be in alinement with the moving push rod; string gripping devices upon the string disk; means to cause each, while moving with the disk, to seize, at a predetermined point of its complete revolution, a piece of string drawn onto the disk; means to cause each gripping device to release the string, upon the last stoppage of the string disk before the device again seizes the string being fed to the disk; means to sever the string simultaneously with said release of the string; the preceding gripping device still retaining the end of the string being fed to the disk; a pair of spring brakes on the frame of the machine, engaging the piece of string, severed, and released by the forward string gripping device; and means to hold the latter device open until it is again in position once more to seize the string fed into the string groove of the string disk; and then to release the device to seize the string; all designed to permit the push rod upon each revolution of the disk, to engage the mid portion of the severed string, and push it away from the disk and out of contact with the string brakes.

6. In the string feed of a tag tying mechanism, a stationary shaft; a table fixed thereto; a rotatable string disk mounted upon said shaft, having a circumferential string groove, and being frictionally resisted in its movements; guideways upon said table; a reciprocating string push rod; a cross head mounted upon the guideways, and carrying said push rod; said push rod operating in the plane of the string groove, and diametrically of the string disk; there being holes, diametrically opposite in the string groove in the disk, through which the push rod may move; means to move the disk one half a revolution, for each revolution of a driving shaft; means timely to reciprocate the string push rod, once for each revolution of the driving shaft; two string gripping devices, diametrically opposite, upon the string disk; means to cause each, while moving with the string disk, at a predetermined point of its complete revolution, to seize a piece of string fed to the string disk; means to cause each gripping device upon the second stoppage of the string disk, after seizing the string, to release the string; means to sever the string at a point diametrically opposite the released end of the string, simultaneously with said release of the string; the gripping device, still retaining the end of the string being fed to the disk; a pair of spring brakes on the frame of the machine, engaging the piece of string, severed, and released by the forward string gripping device; and means to hold the latter gripping device open until it is again in position once more to seize the string fed into the string groove of the string disk; and then to release the device to seize the string so fed; all designed to permit the push rod upon each revolution of the disk, to engage the mid portion of the severed string, and push it away from the disk and out of contact with the string retaining brakes.

In testimony whereof I affix my signature in presence of two witnesses.

CHARLES SYLVESTER.

Witnesses:
E. F. UNIAC,
A. I. CRAWFORD.